United States Patent [19]

Duval

[11] 3,747,231

[45] July 24, 1973

[54] TRAINING DEVICES

[75] Inventor: Bruce Duval, Nassau, Bahamas

[73] Assignee: T.P.I. Limited, Nassau, Bahamas

[22] Filed: Jan. 14, 1972

[21] Appl. No.: 217,791

[52] U.S. Cl. .................................................. 35/11
[51] Int. Cl. ............................................. G09b 9/06
[58] Field of Search ...................................... 35/11

[56] References Cited
UNITED STATES PATENTS

| | | | |
|---|---|---|---|
| 3,486,242 | 12/1969 | Aronson | 35/11 |
| 3,560,644 | 2/1971 | Petrocelli et al. | 35/11 X |
| 3,327,405 | 6/1967 | Ingeneri | 35/9 B |

*Primary Examiner*—Wm. H. Grieb
*Attorney*—Jacobs & Jacobs

[57] ABSTRACT

A sailing simulator with which a pupil can learn something of the art of sailing without taking a sailing craft on water, has a programmable control system for controlling its behaviour, and a programming device for programming the control system so that the behaviour of the simulator may be arranged to suit the requirements of the pupil.

The programming device and programmable control system are preferably in such form that the pupil is provided with a simulation of various wind conditions including conditions in which the wind is of variable force and direction. A program may be combined with an instruction sheet so that the simulator is automatically set in a manner appropriate for the particular lesson. Desirably arrangements are made to plot the supposed course sailed by the pupil so that his performance is ready apparent.

7 Claims, 9 Drawing Figures

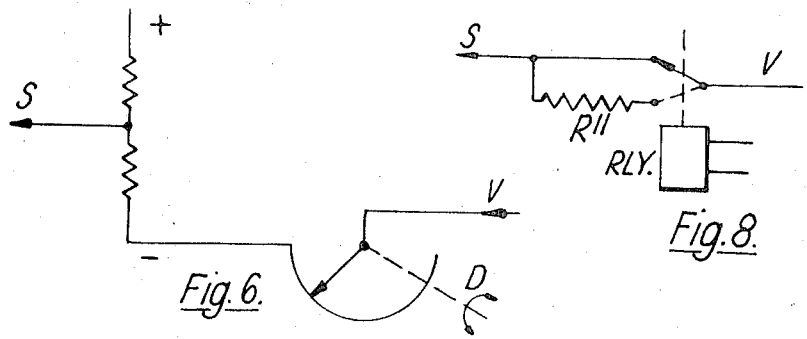
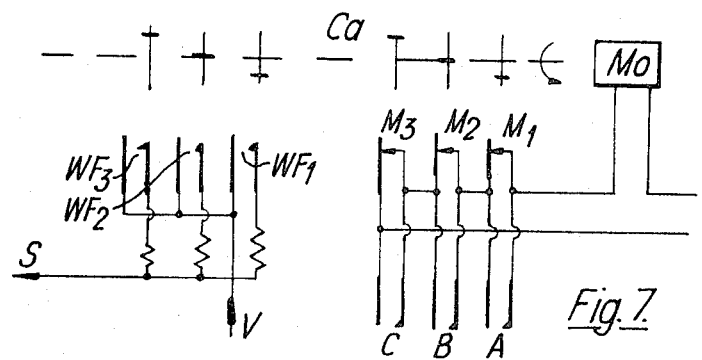
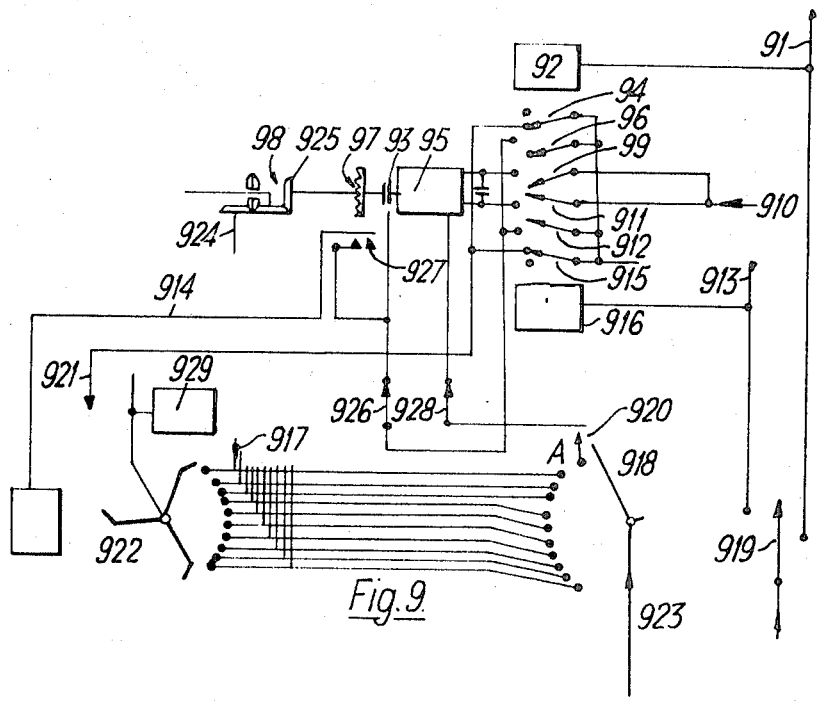

TRAINING DEVICES

The present invention relates to training devices and has as an object the provision of such devices in a new and improved form.

With a sailing simulator, a pupil may be taught something of the art of sailing without taking an actual sailing craft on water. Normally a sailing simulator has a hull unit mounted in mechanical bearings or in a tank of water for heeling movement and steering movement in response to a helm and at least one sail setting control, for example a mainsheet. In some forms of simulator, the steering movement may be simulated by the rotation of a scenic representation around the hull unit instead of changing the heading of the hull unit relative to the earth. In either case the steering movement is simulated by movement of the hull unit relative to its surroundings.

Preferred forms of sailing simulator and controls therefor are described in U.S. Pat. Nos. 3,471,943, 3,457,783, 3,540,134, 3,531,875 and 3,597,856.

In accordance with the present invention, there is provided a sailing simulator having a programable control system for controlling its behaviour and a programing device for programing the control system so that the behaviour of the simulator may be arranged to suit the requirements of a pupil. Such a simulator is of value in that it enables the pupil to experience simulated conditions of, for example, weather and/or handling characteristics as required even in the absence of adjustments made by a skilled attendant.

A preferred form of the simulator comprises a hull unit movable relative to its surroundings to simulate heeling and changes of heading in response to the operation by a pupil of a helm and at least one sail setting control, a programable wind signal generator operable to produce signals representing different wind vectors, means responsive to the wind vector signals and to a sail setting signal to simulate a heeling behaviour similar to that of a sailing craft being sailed upon water and a programing device for programing the wind signal generator to simulate wind conditions required for teaching the pupil.

The programing device may take any convenient form including such forms as a panel provided with knobs operating potentiometers or other continuously variable components which may be set by the pupil in accordance with instructions before starting a lesson. It is advantageous however to provide the device at least partly in a digital rather than analog form, conveniently with a set of switches or other selectors (e.g. magnetic devices or photo cells) of the on-off type. One useful arrangement is to employ the switch contacts of one or more multipole rotary selector switches arranged so that the operation for selecting from predetermined combinations is rendered simple for the pupil.

For simplicity of operation and versatility of programing the selectors are, in a most preferred arrangement, mounted to respond to program articles, such as programs recorded on magnetic tape or punched tape or punched or cut card. A very convenient arrangement for use with a simulator having a track plotting device (U.S. Pat. application Ser. No. 217,794 filed Jan. 14, 1972) is to mount the selectors on the track plotting device and provide them in such a form that they ae responsive to programs carried by charts for the recording of supposed tracks plotted by the plotting device. In practice the charts may bear printed instructions as to the exercises the pupil is to perform under the conditions determined by the program. Micro switches arranged to respond to apertures formed adjacent to one edge of the charts provide a preferred arrangement. In the simplest of cases the insertion of a chart moves a micro switch mechanically and holds it so moved in the absence of an aperture and fails to move it or to hold it moved in the presence of an aperture. It is convenient to regard the micro switches as responsive to the apertures even though the apertures may correspond with absence of movement.

The term "apertures" as used herein is intended to include sections such as slots formed from the edge of the charts as well as perforations bounded on all sides by the material of the charts.

An alternative to having instructions printed on charts is to project the instructions on to a chart from a film or slide projector. In this case the programs may be carried by the film or slides or by program-bearing auxiliary devices separate from the film or slides but manipulated by the projector simultaneously therewith.

The wind vector is the most important variable with which a pupil must learn to deal. Of its two parameters, i.e. force and direction, the latter is considered to be of the greater importance. Accordingly the wind signal generator may give useful results if it is arranged to provide signals representing only changes of wind direction. Preferably it provides signals which also represent changes of wind force.

Parameter changes of a delayed, progressive or cyclic nature may be generated by motor driven devices forming part of the wind signal generator, the action of which is initiated by the programing device. Thus provision is readily made for providing a simulation of gusting, backing and veering winds in response to the programing device. Additionally provision may be made for the simulation of rolling.

The signals representing wind speed and wind direction produced by the wind signal generator in response to the programing device may be fed, as inputs, to the control systems described in the Specifications aforesaid. The signal representing wind direction may also be fed to a device for producing a fluttering motion in a sail when the sail is brought into correspondence with the supposed wind direction - see U.S. Pat. application Ser. No. 205,176 filed Dec. 6, 1971. In actual sailing, the loss of the propulsive effect of a sail is associated with a fluttering motion. With a simulator in accordance with the present invention having a wind signal generator programed to simulate a changing wind direction and also a fluttering device, the pupil is able to obtain useful guidance as to the handling of a craft to maintain headway under close-hauled conditions.

The following description in which reference is made to the accompanying drawings is given in order to illustrate the invention. In the drawings:

FIGS. 2 to 8 show various arrangements for producing signals representing changes of wind force, FIG. 9 shows an apparatus for producing signals representing changes of wind direction.

Figure 1:
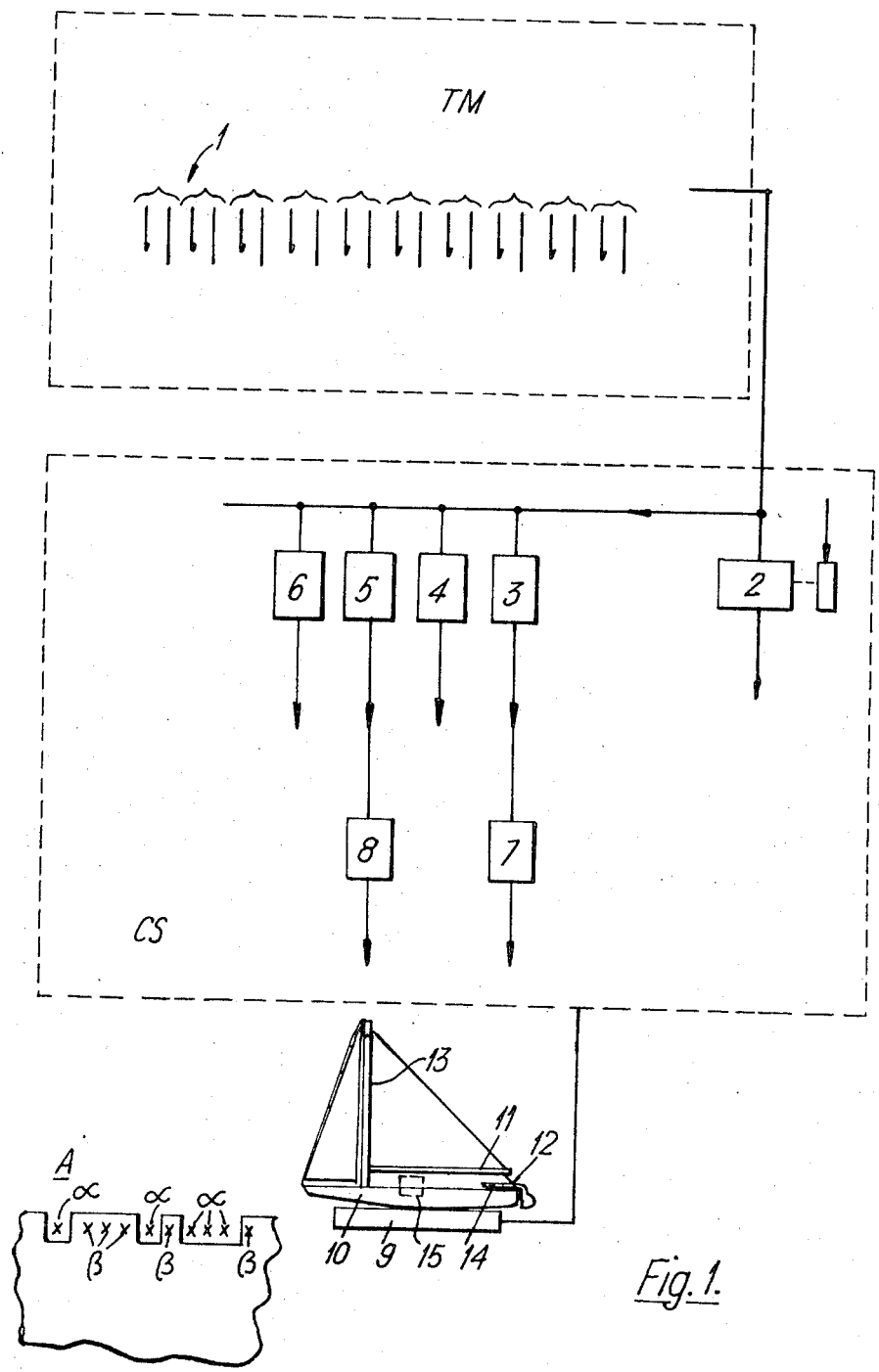
FIG. 1 is a schematic drawing of an apparatus according to the invention.

The apparatus of FIG. 1 has a programing device in the form of a set of micro switches 1 on a part TM, conveniently the table of a course plotting device according to Pat. application Ser. No. 217,794. The switches are responsive to apertures cut in the edges of charts, which bear printed instructions, and receive a plot of the supposed track sailed by the pupil. Part of the edge of a chart is shown at A. The micro switches indicated at α enter apertures and are unaffected when the chart is inserted. The micro switches indicated at β have their plungers or other actuating devices moved by the material of the chart. Different combinations of micro switches are selected by different profiles of the edge of the chart.

A control system CS is responsive to the switches. In the example shown, a motor-driven drum switch 2 is arranged to produce a repeated sequence of behaviour. The units 3, 4, 5 and 6 provide such functions as gusting wind, rolling, backing and veering wind conditions and steady wind force conditions. Switches 7 and 8 provide an over-riding manual control for the pupil or an instructor.

Signals from the control system CS are fed to the power and control apparatus housing 9 of a trainer which has a hull unit 10, a boom 11 movable by a mainsheet (i.e. a rope) 12 and by rotation of the mast 13 as well as a tiller 14. In practice, the part TM is located in the hull unit at 15 for convenient observation and operation by the pupil.

Figure 2:
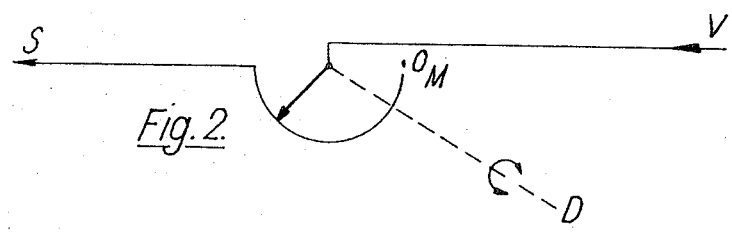
Figure 3:
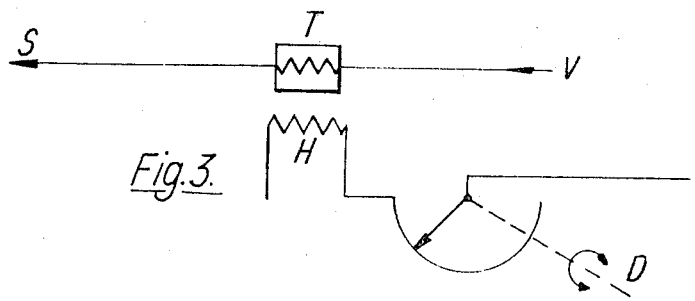
Figure 4:
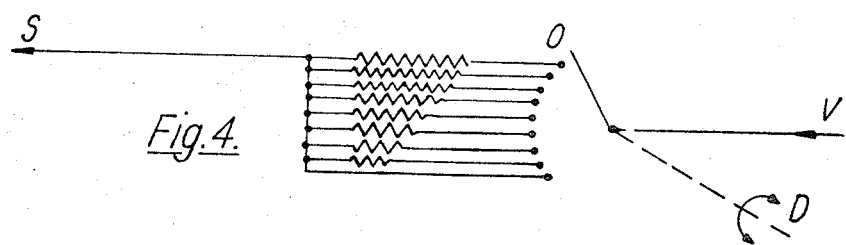
Figure 5:
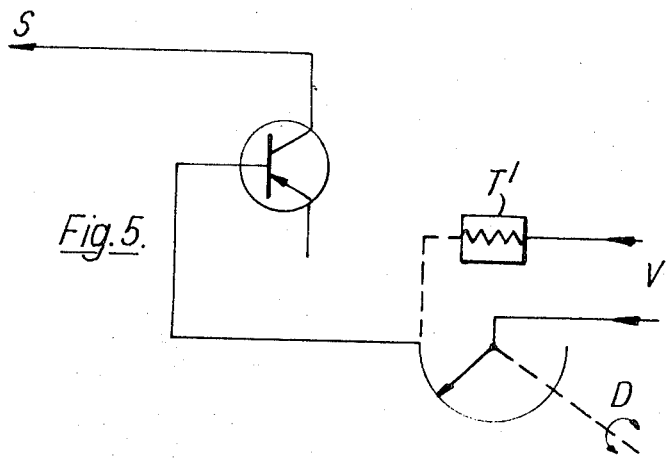

Various arrangements for producing signals at S representing changes of wind force by changing the electrical resistance in a circuit supplied at a voltage V which represents steady wind force are shown in FIGS. 2 to 8. In all cases the resistance is varied by a device schematically shown at D, which is movable manually or by a servo-motor. FIG. 2 shows a simple rheostat with an ultimate position M where the wiper is disconnected from the resistance track to give infinite resistance. FIG. 3 shows a thermistor T whose resistance is variable by a heater H controlled by a rheostat. This arrangement prevents over-rapid changes. FIG. 4 shows a bank of resistors selectable by a selector switch. FIG. 5 shows an environment sensitive resistor T', e.g. a thermistor, for producing random effects to simulate gusting in a manner which cannot be anticipated by the pupil. In this case the small changes are amplified by an amplifier, which is shown diagrammatically as a single stage amplifier but which in practice may have as many stages as may be necessary. FIG. 6 employs a rheostat similar to that of FIG. 2 but forming part of a series circuit from which the input for the control system of the trainer is tapped so that the range of operation is modified.

FIG. 7 shows a programable apparatus for producing changing wind force signals. The motor Mo, driving cams Ca, is brought to a zero or "home" position by conventional homing switching. If the program switches A, B and C are all open, the motor will stop at motor switch $M_1$ when it opens and wind force switch $WF_1$ will close. When switch A is closed the motor will stop at switch $M_2$ and wind force switch $WF_2$ will be closed.

When switches A and B are closed the motor will stop at switch $M_3$ and finally when all three switches are closed the motor will continue to rotate giving a cycling wind force.

FIG. 8 shows an arrangement for simulating gusting by a relay RLY operated by a timing circuit which switches a resistor R" into and out of circuit.

FIG. 9 shows an apparatus for producing signals representing changes of wind direction. It may be arranged for manual operation if desired, but is preferably arranged, together with apparatus for simulating changes of wind force, for programed operation.

A preferred simulator has a resolver differential 98 as described in U.S. Pat. No. 3,457,783 fed mechanically by an input 924 which represents the heading of the craft and an input 925 which represents changes of wind direction. The object of the apparatus of FIG. 9 is to rotate the input 925 through a known angle in relation to the craft. The multi-position switch 918 is set to position A for automatic operation or to one of the settings marked in degrees, convenient steps being 5°. The centre-off switch 919 is set to clockwise or anti-clockwise thus closing contact 99 or 911 by relay 92 or relay 916. Simultaneously the contact 96 or 912 is closed thus energising the electromagnetic clutch 93 and supplying power to the pulse switch 927 which is operated by the toothed wheel 97. One of a third pair of contacts 94 and 915 opens and disconnects the power supply from the homing contacts of a stepping switch 922. The manual control for selecting a wind change, and effecting it, is as follows:

The switch 918 is set to say 15° which means that if the system changes in 5° steps the supply 923 will be connected to the third step of the stepping switch 922. Nothing happens until the switch 919 is set to one of the two directions. Suppose that the direction chosen closes 96 and 99 and opens 94 by energising relay 92. The motor runs from supply 910 and drives the wheel 97 and the resolver 98 via the clutch 93. The switch 927 is opened and closed every 5°. On each pulse via 914, the stepping switch 922 indexes one division and continues to do so until the pre-selected 15° point is reached. When the wiper of 922 reaches the 15° contact the relay 929 is energised and opens contacts 926 and 928. Opening 926 de-energises the clutch 93 and the motor 95. Having made the change the switch 919 is centred once more thus re-energising the homing circuit 921 of the stepping switch 922.

On switching the manual control 918 to position A the program system is energised via 920 and the appropriate connections are made via 917 and 91 or 913.

I claim:
1. A sailing simulator which comprises a hull unit movable relative to its surroundings to simulate heeling and changes of heading in response to the operation by a pupil of a helm and at least one sail setting control, a programable wind signal generator operable to produce signals representing different wind vectors, means responsive to the wind vector signals and to a sail setting signal to simulate a heeling behaviour similar to that of a sailing craft being sailed upon water and a programing device for programing the wind signal generator to simulate wind conditions required for teaching the pupil.

2. A simulator according to claim 1 in which the programing device has a set of switches or other selectors of the on-off type.

3. A simulator according to claim 2 in which the selectors are arranged to be actuated to provide a choice of predetermined combinations.

4. A simulator according to claim 2 in which the selectors are mounted to respond to program articles.

5. A simulator according to claim 2 in which the selectors are mounted upon a track plotting device and are responsive to programs carried by charts for the recording of supposed tracks plotted by the plotting device.

6. A simulator according to claim 5 in which the selectors are arranged to respond to apertures formed adjacent to one edge of the charts.

7. A simulator according to claim 5 in combination with a series of charts bearing instructions for the pupil and carrying programs appropriate to the instructions.

* * * * *